(12) United States Patent
Yu et al.

(10) Patent No.: US 10,685,222 B2
(45) Date of Patent: Jun. 16, 2020

(54) COMPUTERIZED WRITING EVALUATION AND TRAINING METHOD

(71) Applicant: I-Shou University, Kaohsiung (TW)

(72) Inventors: Nan-Ying Yu, Kaohsiung (TW); Shao-Hsia Chang, Kaohsiung (TW)

(73) Assignee: I-Shou University, Kaohsiung (TW)

( * ) Notice: Subject to any disclaimer, the term of this patent is extended or adjusted under 35 U.S.C. 154(b) by 110 days.

(21) Appl. No.: 16/179,777

(22) Filed: Nov. 2, 2018

(65) Prior Publication Data
US 2020/0042784 A1 Feb. 6, 2020

(30) Foreign Application Priority Data

Aug. 2, 2018 (TW) ................ 107126874 A

(51) Int. Cl.
*G06K 9/68* (2006.01)
*G06K 9/00* (2006.01)
*G06K 9/62* (2006.01)

(52) U.S. Cl.
CPC ....... *G06K 9/00416* (2013.01); *G06K 9/6262* (2013.01); *G06K 9/6807* (2013.01)

(58) Field of Classification Search
CPC ............ G06K 9/00416; G06K 9/6807; G06K 9/6262; G06K 9/0442; G06K 2209/01; G06K 2209/03
USPC ....................................................... 382/189
See application file for complete search history.

(56) References Cited

U.S. PATENT DOCUMENTS

| | | | | | |
|---|---|---|---|---|---|
| 5,392,363 | A | * | 2/1995 | Fujisaki | G06K 9/00879 382/187 |
| 5,594,809 | A | * | 1/1997 | Kopec | G06K 9/6297 382/161 |
| 5,854,855 | A | * | 12/1998 | Errico | G06K 9/00422 382/187 |
| 5,970,170 | A | * | 10/1999 | Kadashevich | G06K 9/00872 382/179 |
| 5,991,441 | A | * | 11/1999 | Jourjine | G06K 9/00416 382/187 |
| 6,275,611 | B1 | * | 8/2001 | Parthasarathy | G06K 9/4604 382/187 |
| 2006/0193518 | A1 | * | 8/2006 | Dong | G06K 9/00859 382/186 |
| 2006/0193519 | A1 | * | 8/2006 | Sternby | G06K 9/00416 382/186 |
| 2006/0239560 | A1 | * | 10/2006 | Sternby | G06K 9/00416 382/187 |
| 2012/0141032 | A1 | * | 6/2012 | Ouyang | G06K 9/00422 382/187 |

* cited by examiner

*Primary Examiner* — Ali Bayat

(57) ABSTRACT

A computerized writing evaluation and training method is provided. First, a display interface unit displays a template text, and then, a writing input interface accepts a written text written by a writer, and afterwards, a processing unit segments the written text according to a stroke or a turning point and divides each stroke of the template text and the written text into a line segment or a short arc, and finally, the processing unit compares each stroke information of the template text and the written text and determines whether the written text is correctly written.

9 Claims, 3 Drawing Sheets

COMPUTERIZED WRITING EVALUATION AND TRAINING METHOD

FIELD OF THE INVENTION

The present invention relates to a computerized writing evaluation and training method, and more particularly to a computerized writing evaluation and training method capable of performing vector analysis or parameter analysis on handwriting.

BACKGROUND OF THE INVENTION

Nowadays, smart tablet computers are quite popular. For the learning of fonts, there are quite a lot of software programs that can be applied to smart tablet computers for writers to learn by copying or tracing. However, the way of writing through smart tablet computers is not the most natural paper-and-pencil way, and the size of the written font needs to be fixed in a window square and cannot be resized automatically.

At present, the way to evaluate written fonts using a computer is just to display the handwriting and the sample words at the same time, but the information in the strokes is not parameterized and vectorized. Therefore, when comparing the handwriting with the sample words, there is no effective way to deal with the relevant information that each stroke of the handwriting refers to which stroke of the sample words in the original intention of the writer, or each stroke of the handwriting corresponds to which stroke of the sample words. In the case of one character with multiple strokes, since each stroke is a set of point coordinates in a two-dimension space, it is impossible to judge the correctness and neatness of the handwriting if the vector or parameter of the input handwriting cannot be effectively analyzed.

Therefore, how to perform vector or parameter analysis on the input handwriting, so that the point coordinates of each stroke of the handwriting input can be characterized by a set, and the correctness and neatness of a font can be evaluated quantitatively and objectively during writing practice, will be the focus of the problem in the present invention.

SUMMARY OF THE INVENTION

One object of the present invention is to provide a computerized writing evaluation and training method capable of performing vector or parameter analysis on input handwriting.

Another object of the present invention is to provide a computerized writing evaluation and training method capable of evaluating the correctness and neatness of a font quantitatively and objectively during writing practice.

A computerized writing evaluation and training method of the present invention is used for a computerized writing evaluation and training system to compare a template text with a written text written by a writer, and generate a plurality pieces of stroke information corresponding to the template text and the written text, the computerized writing evaluation and training system comprising a writing input interface unit, a display interface unit and a processing unit, and the writing input interface unit, the display interface unit and the processing unit are mutually signal-connected, wherein the computerized writing evaluation and training method comprises following steps of:

a) displaying, by the display interface unit, the template text;

b) accepting, by the writing input interface, the written text written by the writer;

c) segmenting, by the processing unit, the written text according to a stroke or a turning point;

d) dividing, by the processing unit, each stroke of the template text and the written text into a line segment or a short arc; and e) comparing, by the processing unit, each stroke information of the template text and the written text, and determining, by the processing unit, whether the written text is correctly written.

In the computerized writing evaluation and training method according to the present invention, a processing unit segments a written text according to a stroke or a turning point and divides each stroke of the template text and the written text into a line segment or a short arc. In this way, the vector or parameter analysis can be performed on the handwriting input by a writer so that the point coordinates of each stroke of the handwriting input can be characterized by a set, which can be used to determine each stroke of the handwriting refers to which stroke of the sample words in the original intention of the writer, and the correctness and neatness of a font can be evaluated quantitatively and objectively during the writing practice, so as to achieve all of the above objectives.

DETAILED DESCRIPTION OF PREFERRED EMBODIMENTS

Figure 1:
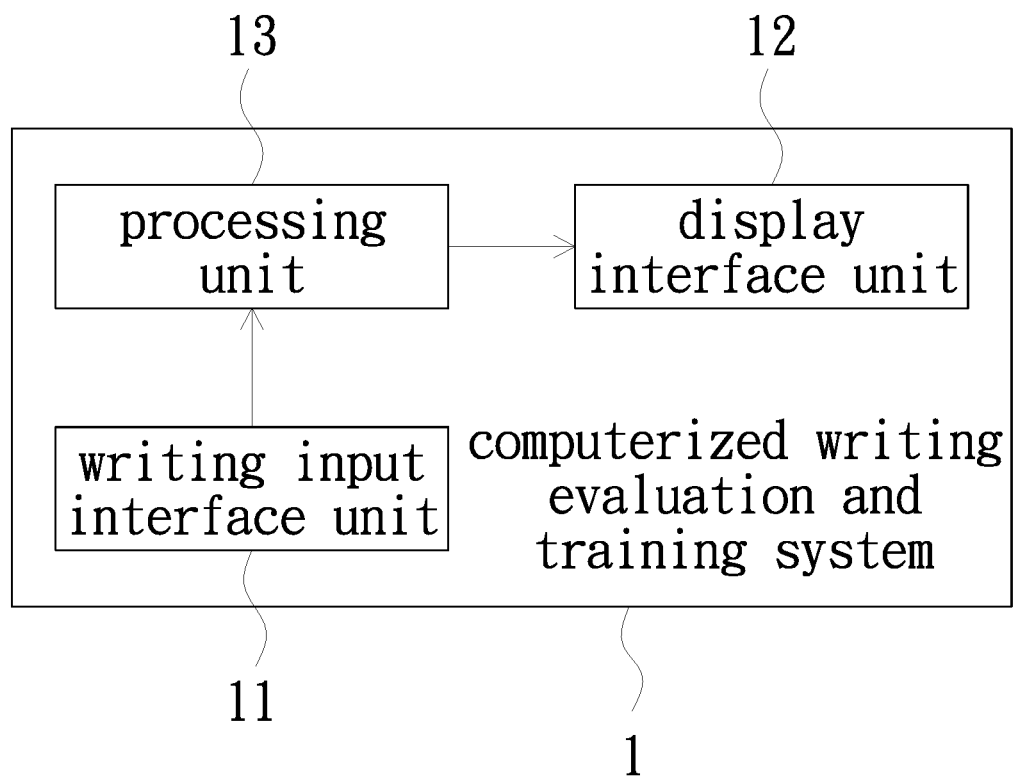
FIG. 1 is a block diagram of a computerized writing evaluation and training method according to an embodiment of the present invention.

As shown in FIG. 1, a computerized writing evaluation and training method according to an embodiment of the present invention is used for a computerized writing evaluation and training system 1 to compare a template text with a written word written by a writer, and generate a plurality pieces of stroke information corresponding to the template text and the written text. The computerized writing evaluation and training system 1 is exemplified by a smart tablet in this embodiment, and includes a writing input interface unit 11, a display interface unit 12, and a processing unit 13, wherein the writing input interface unit 11, the display interface unit 12 and the processing unit 13 are mutually signal-connected. Although the computerized writing evaluation and training system 1 is exemplified by a smart tablet in this embodiment, it is understood that the computerized writing evaluation and training system 1 can also be applied to a computer with a digital tablet for those of ordinary skill in the art.

Figure 2:
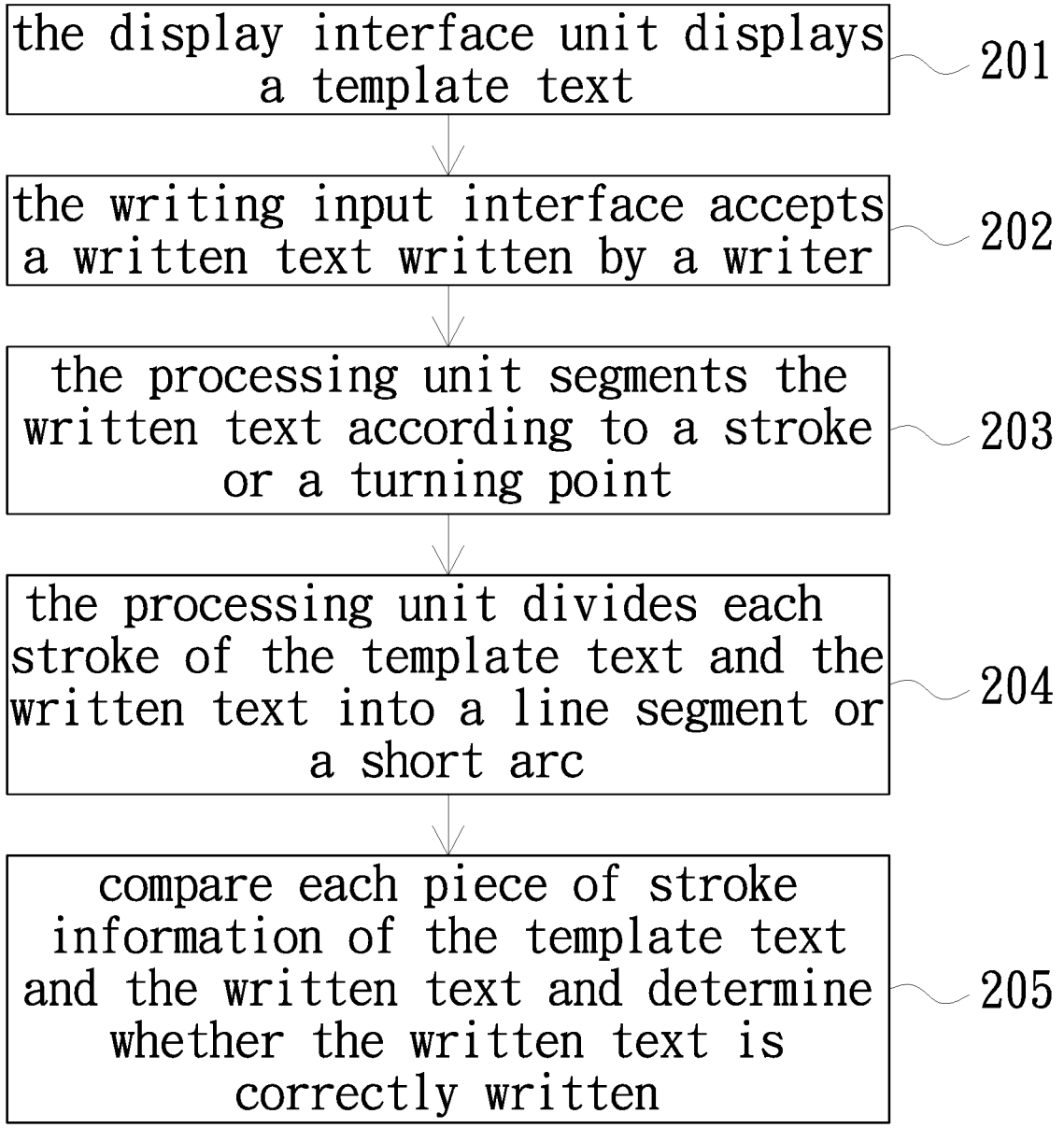
FIG. 2 is a flow chart of the computerized writing evaluation and training method of FIG. 1.

Refer to FIG. 2 together. FIG. 2 is a flowchart of a computerized writing evaluation and training method according to an embodiment of the present invention. First, step 201: the display interface unit 12 displays a template text, wherein the template text is generated by a program automatically. Thereafter, step 202: the writing input interface 11 accepts a written text written by a writer. Thereafter, step 203: the processing unit 13 segments the written text according to a stroke or a turning point. Thereafter, step 204:

the processing unit 13 divides each stroke of the template text and the written text into a line segment or a short arc, wherein the stroke information of the written text is generated in a vector manner according to a position, a length and a direction of each stroke of the written text and then the stroke information is recorded. The stroke information is approximated by a quadratic or cubic linear polynomial, and positional information of the stroke information is constructed by interpolation, wherein the interpolation is a functional formula that derives new data points within a range by known discrete data points. Finally, step 205: the processing unit 13 compares each stroke information of the template text and the written text, and determines whether the written text is correctly written.

Figure 3:
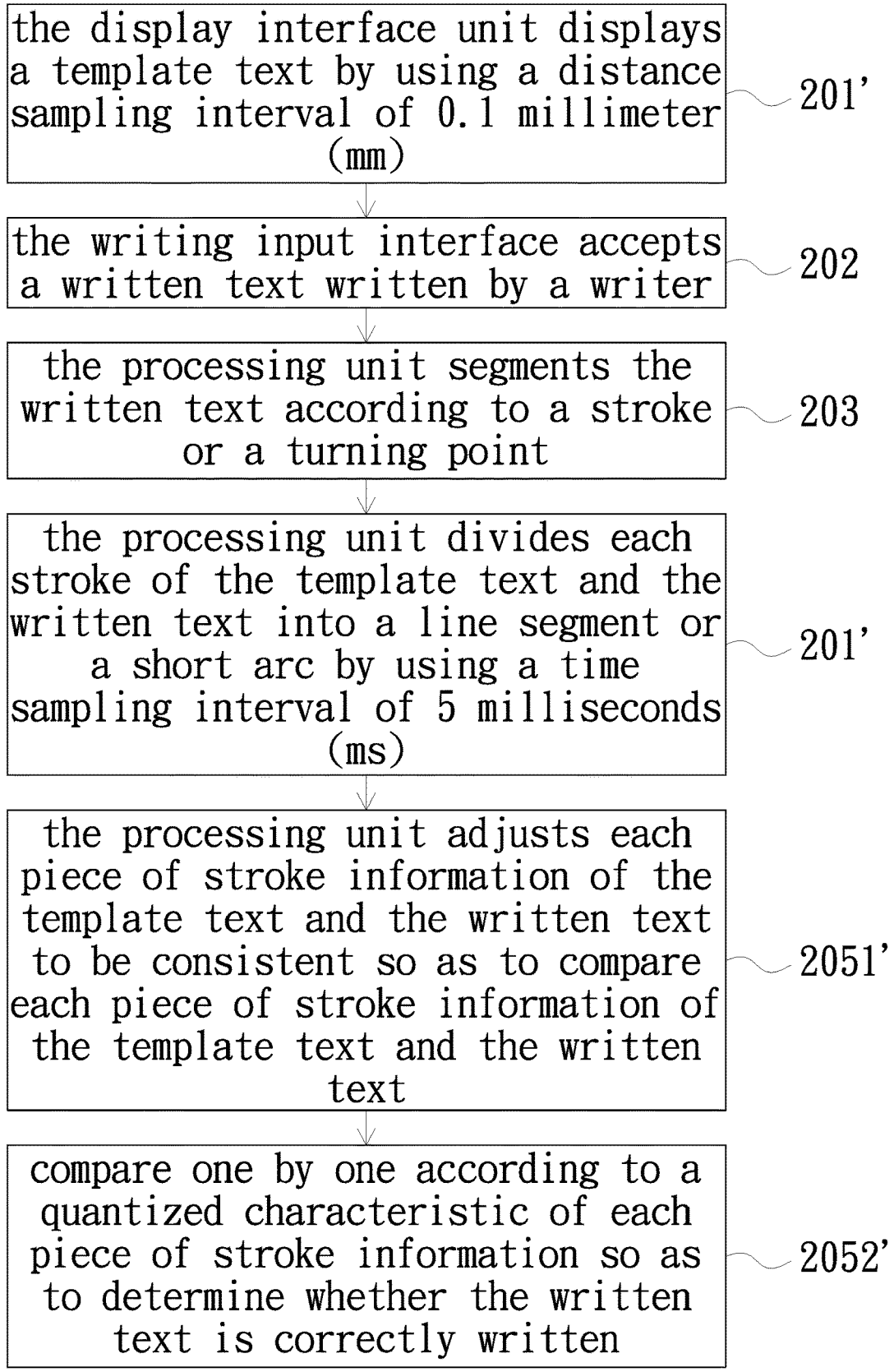
FIG. 3 is a flow chart of a computerized writing evaluation and training method according to another embodiment of the present invention.

Refer to FIG. 1 and FIG. 3 together. FIG. 3 is a flowchart of a computerized writing evaluation and training method according to another embodiment of the present invention. In this embodiment, first, step 201': the display interface unit 12 displays a template text, wherein since the template text is generated by a program automatically, the sampling points can be a fixed interval and the template text can be displayed in a font range of 2×2 centimeter, and the stroke information of the template text is obtained by using a distance sampling interval of 0.1 millimeter (mm) Step 202 and 203 are the same as the previous embodiment. Thereafter, step 204': the processing unit 13 divides each stroke of the template text and the written text into a line segment or a short arc, wherein the sampling interval is a fixed time since the written text is not generated automatically. In this embodiment, the stroke information of the written text is obtained by using a time sampling interval of 5 milliseconds (ins). Thereafter, step 2051': the processing unit 13 adjusts each piece of stroke information of the template text and the written text to be consistent so as to compare each piece of stroke information of the template text and the written text, wherein a specification and a size of the stroke information of the written text are standardized according to the template text. Finally, step 2052': comparing one by one according to a quantized characteristic of each piece of stroke information so as to determine whether the written text is correctly written. The way to compare the quantized characteristic of the stroke information is defining a number of strokes of the stroke information of the template text as in, defining a number of strokes of the stroke information of the written text as n, defining a number of strokes in the stroke information of the written text that matches the template text as p, and performing m×n comparisons by the processing unit 13, wherein a correct rate of the written text obtained by the processing unit 13 after comparison is p/m, and the processing unit 13 determines that the written text has been correctly written when m=n=p.

In the computerized writing evaluation and training method according to the present invention, a processing unit segments a written text according to a stroke or a turning point and divides each stroke of the template text and the written text into a line segment or a short arc. In this way, the vector or parameter analysis can be performed on the handwriting input by the writer so that the point coordinates of each stroke of the handwriting input can be characterized by a set, which can be used to determine each stroke of the handwriting refers to which stroke of the sample words in the original intention of the writer, and the correctness and neatness of a text can be evaluated quantitatively and objectively during the writing practice, so as to achieve all of the above objectives.

What is claimed is:

1. A computerized writing evaluation and training method for a computerized writing evaluation and training system to compare a template text with a written text written by a writer and generate a plurality pieces of stroke information corresponding to the template text and the written text, the computerized writing evaluation and training system comprising a writing input interface unit, a display interface unit and a processing unit, and the writing input interface unit, the display interface unit and the processing unit are mutually signal-connected, wherein the computerized writing evaluation and training method comprises following steps of:
   a) displaying, by the display interface unit, the template text;
   b) accepting, by the writing input interface, the written text written by the writer;
   c) segmenting, by the processing unit, the written text according to a stroke or a turning point;
   d) dividing, by the processing unit, each stroke of the template text and the written text into a line segment or a short arc; and
   e) comparing, by the processing unit, each of the plurality piece of stroke information of the template text and the written text, and determining, by the processing unit, whether the written text is correctly written.

2. The computerized writing evaluation and training method according to claim 1, wherein the step d) comprises a step of:
   d1) generating the plurality pieces of stroke information of the written text in a vector manner according to a position, a length and a direction of each stroke of the written text and recording the plurality pieces of stroke information.

3. The computerized writing evaluation and training method according to claim 2, wherein the step d1) comprises a step of:
   d11) approximating the plurality pieces of stroke information by a quadratic or cubic linear polynomial, and constructing positional information of the plurality pieces of stroke information by interpolation.

4. The computerized writing evaluation and training method according to claim 1, wherein the step a) comprises a step of:
   a1) generating the template text by a program automatically.

5. The computerized writing evaluation and training method according to claim 1, wherein the step a1) comprises a step of:
   a2) obtaining the plurality pieces of stroke information of the template text by using a distance sampling interval of 0.1 millimeter.

6. The computerized writing evaluation and training method according to claim 1, wherein the step d) comprises a step of:
   d2) obtaining the plurality pieces of stroke information of the written text by using a time sampling interval of 5 milliseconds.

7. The computerized writing evaluation and training method according to claim 1, wherein the step e) comprises steps of:
   e1) adjusting, by the processing unit, each of the plurality pieces of stroke information of the template text and the written text to be consistent; and
   e2) performing a comparison one by one according to a quantized characteristic of each of the plurality pieces of stroke information.

8. The computerized writing evaluation and training method according to claim 7, wherein the step e1) comprises a step of:

e11) standardizing a specification and a size of the plurality pieces of stroke information of the written text according to the template text.

9. The computerized writing evaluation and training method according to claim 7, wherein the step e2) comprises a step of:

e21) defining a number of strokes of the plurality pieces of stroke information of the template text as m, defining a number of strokes of the plurality pieces of stroke information of the written text as n, defining a number of strokes in the plurality pieces of stroke information of the written text that matches the template text as p, and performing, by the processing unit, m×n comparisons, wherein a correct rate of the written text obtained by the processing unit after comparison is p/m, and the processing unit determines that the written text has been correctly written when m=n=p.

\* \* \* \* \*